United States Patent Office 3,734,929
Patented May 22, 1973

3,734,929
HEXAHYDRO - 3,3,6,6 - TETRAMETHYLFLURO-[3,2-b]-FURAN-2,5-DIONE AND METHOD OF ITS PREPARATION
Alfred G. Robinson, Longview, Tex., assignor to Eastman Kodak Company, Rochester, N.Y.
No Drawing. Continuation-in-part of application Ser. No. 45,218, June 10, 1970. This application Aug. 27, 1971, Ser. No. 175,724
Int. Cl. C07d 5/46
U.S. Cl. 260—343.6
1 Claim

ABSTRACT OF THE DISCLOSURE

Hexahydro - 3,3,6, - tetramethylfuro-[3,2-b]-furan-2,5-dione is formed by the oxidation of hexahydro-3,3,6,6-tetramethylfuro-[3,2-b]-furan-2,5-diol using hypohalous acid or salts of a hypohalous acid. The reaction may be conducted under atmospheric pressure at temperatures from about 5° C. to about 90° C. The novel compound hexahydro - 3,3,6,6 - tetramethylfuro-[3,2 - b]-furan-2,5-diol is useful as a reactive chemical intermediate which can be used to produce stabilizers for plastics, solvents, plasticizers, synthetic lubricants and polyesters.

This application is a continuation-in-part of Robinson and Hagemeyer earlier application, Ser. No. 45,218, filed June 10, 1970, now U.S. Pat. 3,671,550.

This invention relates to a novel compound, hexahydro - 3,3,6,6 - tetramethylfuro - [3,2-b] - furan-2,5-dione, and a method of its preparation. More specifically, this invention relates to the preparation of hexahydro-3,3,6,6-tetramethylfuro-[3,2-b]-furan-2,5-dione from hexahydro-3,3,6,6-tetramethylfuro-[3,2-b]-furan-2,5-diol.

Hexahydro - 3,3,6,6-tetramethylfuro-[3,2-b]-furan-2,5-dione is a valuable intermediate for the preparation of numerous products. For example, it can be reacted with carbonates to form compounds suitable as stabilizers for plastics according to the following reaction:

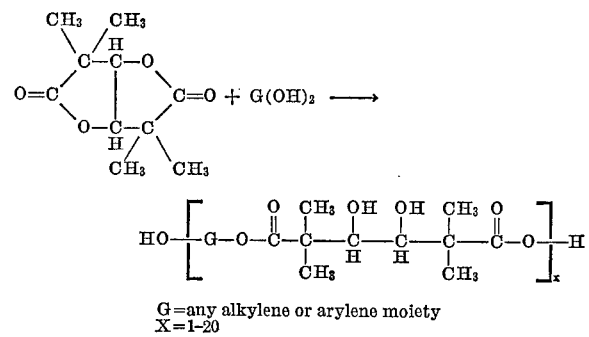

M=Ba, Cd or Zn

The notation "½" indicates that the bivalent metal is attached to the organic compound by only a single bond. The remaining bond may be with another organic molecule to yield a polymer-like structure. In addition, it can be reacted with alcohols to form esters suitable for use as solvents, plasticizers and synthetic lubricants. This reaction may be represented as follows:

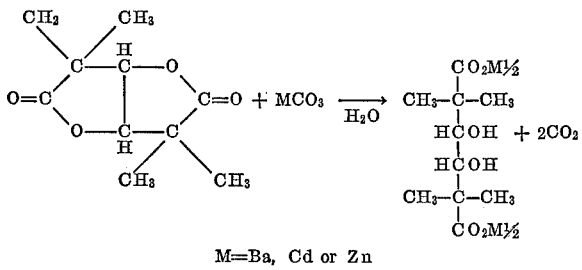

It may also be reacted with polyols to form polyesters suitable for use in coatings. This type of reaction may be represented as follows:

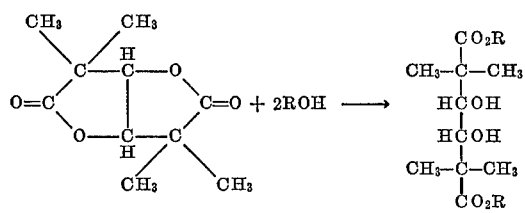

G=any alkylene or arylene moiety
X=1-20

Therefore, an object of this invention is to produce hexahydro - 3,3,6,6 - tetramethylfuro - [3,2-b] - furan-2,5-dione.

A further object is to produce hexahydro-3,3,6,6-tetramethylfuro-[3,2-b]-furan-2,5-dione from hexahydro-3,3,6,6-tetramethylfuro-[3,2-b]-furan-2,5-diol.

These and other objects will be apparent hereinafter.

The novel starting material, hexahydro-3,3,6,6-tetramethylfuro-[3,2-b]-furan-2,5-diol, and a method for its preparation have been disclosed in U.S. patent application Ser. No. 45,218, filed June 10, 1970, now U.S. Pat. 3,671,-550, which is incorporated herein by reference. As was demonstrated in that application, the novel feed material was found to be unusually stable when subjected to various reagents.

The preparation of the dione of the invention is believed to be according to the following reaction.

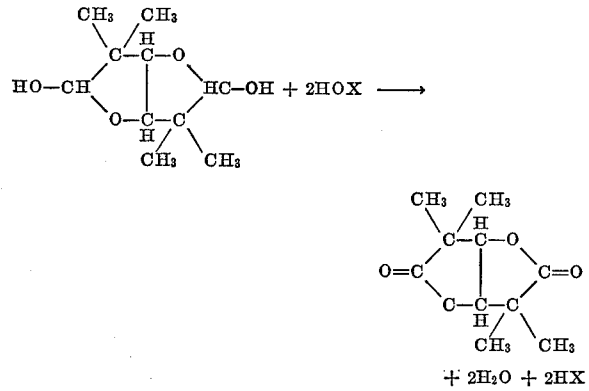

wherein X is either Cl, Br or I.

This reaction may be conducted at temperatures of from about 5° C. to about 90° C. and preferably from 25° C. to 75° C. to give good yields of the dione. The reaction proceeds quite readily at atmospheric pressure although reduced or superatmospheric pressures may be used if desired. The only known limitation is that the oxidizing agent must be present in at least a stoichiometric ratio with the feed diol. Preferably, the oxidizing agent is present in excess of the stoichiometric ratio. The oxidizing agent may be either a hypohalous acid of the type HOX wherein X=Cl, Br or I or a salt thereof.

The following examples are set forth for the purpose of illustration and it should be understood that they are not to be construed as limiting the invention in any manner.

EXAMPLE 1

One gram of hexahydro-3,3,6,6-tetramethylfuro-[3,2-b]-furan-2,5-diol is dissolved in 25 ml. of water containing 2 grams of bromine. After stirring for 15 minutes, a white precipitate appears. The mixture is then heated on a steam bath for 2 hours. After cooling, 0.85 gram of a white solid product is collected by filtration. The melting point is determined to be 163° C. Infrared, NMR and molecular weight analysis show the product to be hexahydro-3,3,6,6-tetramethylfuro-[3,2-b]-furan-2,5-dione.

EXAMPLE 2

In a 100-ml. beaker is placed 500 ml. of a 5% sodium hypochlorite-95% water solution and 1.5 grams of hexahydro - 3,3,6,6 - tetramethylfuro-[3,2-b]-furan-2,5-dione. After heating on a steam bath for two days, water is removed by distillation and the solid product (1.1 grams) isolated by filtration. The product is shown to be identical to that obtained in Example 1.

The invention has been described in detail with particular reference to certain preferred embodiments thereof, but it will be understood that variations and modification can be effected within the spirit and scope of the invention.

I claim:
1. The compound hexahydro-3,3,6,6-tetramethylfuro-[3,2-b]-furan-2,5-dione.

References Cited

UNITED STATES PATENTS 3,671,550   6/1972   Hagemeyer et al. ___ 260—347.8

OTHER REFERENCES

Houben-Weyl: Methoden der Organischen Chemie, 1963, p. 721 relied on.

ALEX MAZEL, Primary Examiner
A. M. TIGHE, Assistant Examiner

U.S. Cl. X.R.

260—347.8, 429 R, 429.9, 484 P, 860; 106—287; 252—56